US010872036B1

(12) United States Patent
Gole (10) Patent No.: US 10,872,036 B1
(45) Date of Patent: Dec. 22, 2020

(54) METHODS FOR FACILITATING EFFICIENT STORAGE OPERATIONS USING HOST-MANAGED SOLID-STATE DISKS AND DEVICES THEREOF

(71) Applicant: NetApp, Inc., Sunnyvale, CA (US)

(72) Inventor: Abhijeet Gole, Cupertino, CA (US)

(73) Assignee: NETAPP, INC., Sunnyvale, CA (US)

( * ) Notice: Subject to any disclaimer, the term of this patent is extended or adjusted under 35 U.S.C. 154(b) by 0 days.

(21) Appl. No.: 16/428,894

(22) Filed: May 31, 2019

(51) Int. Cl.
*G06F 12/02* (2006.01)
*G06F 3/06* (2006.01)
*G06F 12/1081* (2016.01)

(52) U.S. Cl.
CPC ........ *G06F 12/0246* (2013.01); *G06F 3/0604* (2013.01); *G06F 3/064* (2013.01); *G06F 3/0656* (2013.01); *G06F 3/0679* (2013.01); *G06F 12/1081* (2013.01)

(58) Field of Classification Search
CPC .... G06F 12/0246; G06F 3/0604; G06F 3/064; G06F 3/0656; G06F 3/0679
See application file for complete search history.

(56) References Cited

U.S. PATENT DOCUMENTS

2019/0042146 A1\* 2/2019 Wysoczanski ........ G06F 3/0616
2019/0324859 A1\* 10/2019 Armstrong ............. G11C 5/143

\* cited by examiner

*Primary Examiner* — Ryan Bertram
*Assistant Examiner* — Edmund H Kwong
(74) *Attorney, Agent, or Firm* — Troutman Pepper Hamilton Sanders LLP (Rochester)

(57) ABSTRACT

Methods, non-transitory machine readable media, and computing devices that facilitate efficient storage operations using host-managed solid-state disks (SSDs) are disclosed. With this technology, a direct memory access (DMA) transfer is initiated of a data block from a location indicated in an application write request to a write buffer in a device memory of an SSD. A determination is made when write rule(s) are satisfied based on content of the write buffer including at least the data block and other data block(s) previously transferred to the write buffer. A copy request is issued to transfer a portion of the content to flash media of the SSD, when the write rule(s) are satisfied. This technology does not require host memory for write buffering or processor cycles for copying data from application data buffers to a write buffer in host memory, and thereby significantly improves resource utilization of host devices managing SSDs.

20 Claims, 4 Drawing Sheets

METHODS FOR FACILITATING EFFICIENT STORAGE OPERATIONS USING HOST-MANAGED SOLID-STATE DISKS AND DEVICES THEREOF

FIELD

This technology relates to data storage devices and, more particularly, to methods and devices for facilitating efficient storage operations using host-managed solid-state disks (SSDs).

BACKGROUND

Data storage networks often include storage servers and other types of devices hosting applications that store data on solid-state disks (SSDs). SSDs typically use not-and (NAND) flash as the storage medium. While the storage media has traditionally been hidden from the host devices, open channel SSDs or host-developed that expose the storage media to the host device. Exposing the storage media to the host devices enables applications to more optimally place data in specific locations in the storage media.

However, NAND flash storage media has restrictive rules with respect to storage operations. For example, write operations are required to be executed in strict sequential order and a minimum write size is required before data can be stored. Various application concurrency and processor scheduling effects can cause write operations to be delivered in non-sequential order. Accordingly, data associated with write operations is buffered to enable the operations to be sequenced to the storage media in conformance with the rules.

Host devices host a flash translation layer (FTL) implemented in software that is responsible for translating storage operations directly to the flash storage media of an SSD. The FTL copies data from write operations issued by an application into a host memory write buffer. By placing the data into specific locations inside the host memory write buffer, the FTL can ensure the requisite data order. Once the FTL has received a commit from the application, and the data in a particular sequence, the FTL issues a physical media write request to the SSD to write the data to the flash storage media.

Unfortunately, host devices currently dedicate a significant amount of memory for a write buffer for each host-managed SSD. Additionally, the FTLs on host devices utilize significant resources of the processor(s) of the host devices to copy data from application data buffers to the host memory write buffers, for example. The use of processor cycles to facilitate data transfers to the write buffer results in increased latency, decreased throughput, and/or reduced performance of the provided storage services.

DETAILED DESCRIPTION

Figure 1:
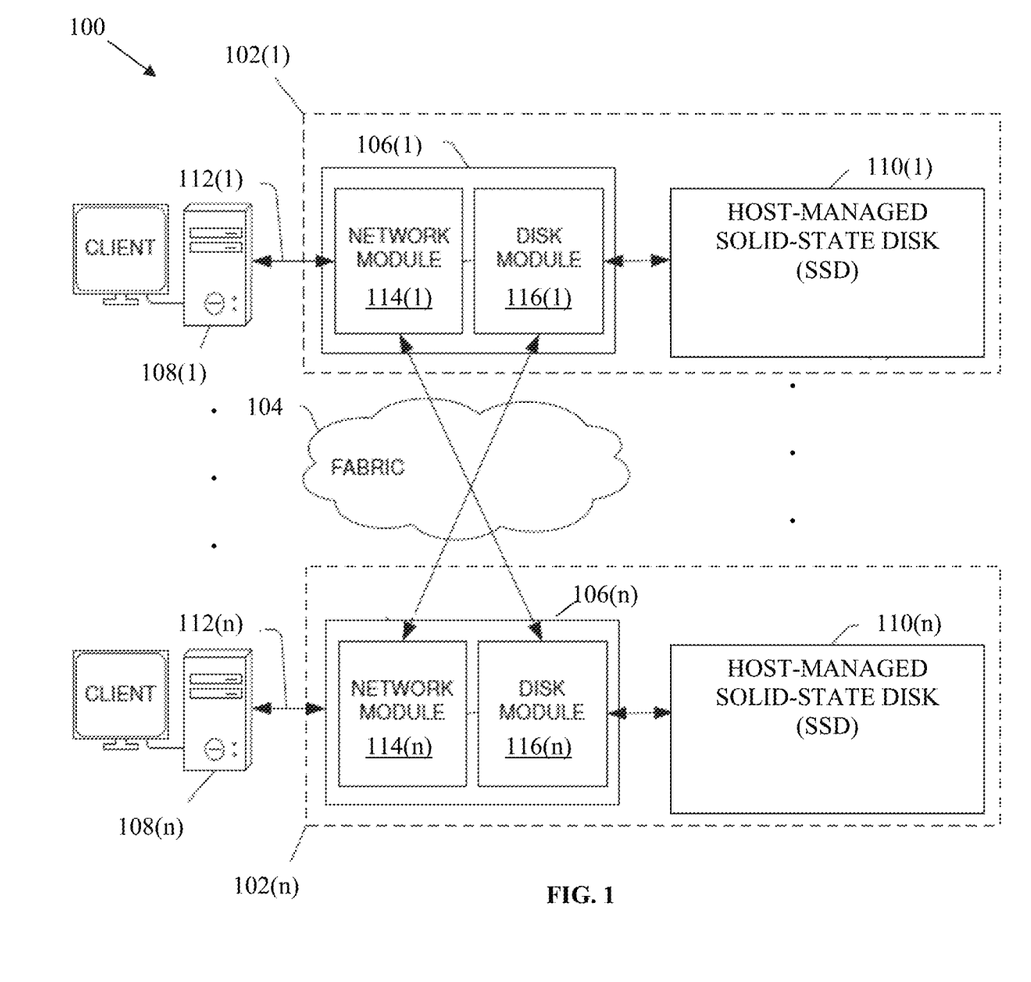
FIG. 1 is a block diagram of a network environment with exemplary host devices.

A clustered network environment 100 that may implement one or more aspects of the technology described and illustrated herein is shown in FIG. 1. The clustered network environment 100 includes host computing devices 102(1)-102(n) that are coupled over a cluster or data fabric 104 that includes one or more communication network(s) and facilitates communication between the host computing devices 102(1)-102(n) (and one or more modules, components, etc. therein, such as, nodes 106(1)-106(n), for example), although any number of other elements or components can also be included in the clustered network environment 100 in other examples. This technology provides a number of advantages including methods, non-transitory computer readable media, and computing devices that improve resource utilization of devices hosting applications that utilize host-managed solid-state disks (SSDs) for storage operations.

In this example, nodes 106(1)-106(n) can be primary or local storage controllers or secondary or remote storage controllers that provide client devices 108(1)-108(n) with access to data stored within host-managed SSDs 110(1)-110(n). The host computing devices 102(1)-102(n) of the examples described and illustrated herein are not limited to any particular geographic areas and can be clustered locally and/or remotely. Thus, in one example the host computing devices 102(1)-102(n) can be distributed over a plurality of storage systems located in a plurality of geographic locations; while in another example a clustered network can include host computing devices 102(1)-102(n) residing in a same geographic location (e.g., in a single on-site rack).

In the illustrated example, one or more of the client devices 108(1)-108(n), which may be, for example, personal computers (PCs), computing devices used for storage (e.g., storage servers), or other computers or peripheral devices, are coupled to the respective host computing devices 102(1)-102(n) by network connections 112(1)-112(n). Network connections 112(1)-112(n) may include a local area network (LAN) or wide area network (WAN), for example, that utilize Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 108(1)-108(n) may be general-purpose computers running applications and may interact with the host computing devices 102(1)-102(n) using a client/server model for exchange of information. That is, the client devices 108(1)-108(n) may request data from the host computing devices 102(1)-102(n) (e.g., data on one of the host-managed SSDs 110(1)-110(n) managed by a network storage controller configured to process I/O commands issued by the client devices 108(1)-108(n)), and the host computing devices 102(1)-102(n) may return results of the request to the client devices 108(1)-108(n) via the network connections 112(1)-112(n).

While the host computing devices 102(1)-102(n) are disclosed in this example as including only host-managed SSDs 110(1)-110(n) for storage, other types of mass storage devices including hard disk drives (HDDs), magnetic disk drives, and any other similar media adapted to store information, including, for example, data and/or parity information, can also be utilized by the host computing devices 102(1)-102(n) in other examples.

The nodes 106(1)-106(n) of the host computing devices 102(1)-102(n) can include network or host nodes that are interconnected as a cluster to provide data storage and management services, such as to an enterprise having remote locations, cloud storage, etc., for example. Such nodes 106(1)-106(n) can be attached to the fabric 104 at a connection point, redistribution point, or communication endpoint, for example. One or more of the host computing devices 106(1)-106(n) may be capable of sending, receiving, and/or forwarding information over a network communications channel, and could comprise any type of device that meets any or all of these criteria.

In an example, the nodes 106(1) and 106(n) may be configured according to a disaster recovery configuration whereby a surviving takeover node provides switchover access to the host-managed SSDs 110(1)-110(n) in the event a failure or planned takeover event occurs (e.g., the node 106(1) provides client device 108(n) with switchover data access to host-managed SSD 110(1)). Additionally, while two nodes and host computing devices are illustrated in FIG. 1, any number of nodes or host computing devices can be included in other examples in other types of configurations or arrangements.

As illustrated in the clustered network environment 100, nodes 106(1)-106(n) can include various functional components that coordinate to provide a distributed storage architecture. For example, the nodes 106(1)-106(n) can include network modules 114(1)-114(n) and disk modules 116(1)-116(n). Network modules 114(1)-114(n) can be configured to allow the nodes 106(1)-106(n) (e.g., network storage controllers) to connect with client devices 108(1)-108(n) over the storage network connections 112(1)-112(n), for example, allowing the client devices 108(1)-108(n) to access data stored in the clustered network environment 100.

Further, the network modules 114(1)-114(n) can provide connections with one or more other components through the cluster fabric 104. For example, the network module 114(1) of node 106(1) can access the host-managed SSD 110(n) by sending a request via the cluster fabric 104 through the disk module 116(n) of node 106(n). The cluster fabric 104 can include one or more local and/or wide area computing networks embodied as Infiniband, Fibre Channel (FC), or Ethernet networks, for example, although other types of networks supporting other protocols can also be used.

In some examples, the host-managed SSDs 110(1)-110(n) can be locally-attached (e.g., via a system bus). In other examples, disk modules 116(1)-116(n) can be configured to connect host-managed SSDs 110(1)-110(n) to the nodes 106(1)-106(n). Sometimes, disk modules 116(1)-116(n) communicate with the host-managed SSDs 110(1)-110(n) according to Fabric protocols, such as NVMeoF, for example, although other protocols can also be used. Thus, as seen from an operating system on node computing devices 106(1)-106(n), the data storage devices 110(1)-110(n) can appear as locally attached in these examples. In this manner, different nodes 106(1)-106(n) may access data blocks, files, or objects through the operating system, rather than expressly requesting abstract files.

While the clustered network environment 100 illustrates an equal number of network modules 114(1)-114(n) and disk modules 116(1)-116(n), other examples may include a differing number of these modules. For example, there may be a plurality of network and disk modules interconnected in a cluster that do not have a one-to-one correspondence between the network and disk modules. That is, different nodes can have a different number of network and disk modules, and the same node can have a different number of network modules than disk modules.

Further, one or more of the client devices 108(1)-108(n) can be networked with the nodes 106(1)-106(n) in the cluster, over the storage connections 112(1)-112(n). As an example, respective client devices 108(1)-108(n) that are networked to a cluster may request services (e.g., exchanging of information in the form of data packets) of nodes 106(1)-106(n) in the cluster, and the nodes 106(1)-106(n) can return results of the requested services to the client devices 108(1)-108(n). In one example, the client devices 108(1)-108(n) can exchange information with the network modules 114(1)-114(n) residing in the node computing devices 106(1)-106(n) (e.g., network hosts) in the host computing devices 102(1)-102(n).

In one example, the host computing devices 102(1)-102(n) host aggregates corresponding to physical local and/or remote data storage devices, such as local flash media in the host-managed SSDs 110(1)-110(n), for example. One or more of the host-managed SSDs 110(1)-110(n) can include mass storage devices, such as disks of a disk array. In this particular example, the host-managed SSDs 110(1)-110(n) include device memory (e.g., dynamic random access memory (DRAM) and flash media, as described and illustrated in more detail later with reference to FIG. 2.

The aggregates in this example include volumes, which are virtual data stores or storage objects that define an arrangement of storage and one or more filesystems within the clustered network environment 100. Volumes can span a portion of a disk or other storage device, a collection of disks, or portions of disks, for example, and typically define an overall logical arrangement of data storage. In one example, volumes can include stored user data as one or more files, blocks, or objects that reside in a hierarchical directory structure within the volumes.

Volumes are typically configured in formats that may be associated with particular storage systems, and respective volume formats typically comprise features that provide functionality to the volumes, such as providing the ability for volumes to form clusters, among other functionality. Optionally, one or more of the volumes can be in composite aggregates and can extend between one or more of the host-managed SSDs 110(1)-110(n) and, optionally, one or more cloud storage device(s) (not shown) to provide tiered storage, for example, and other arrangements can also be used in other examples.

To facilitate access to data stored on the host-managed SSDs 110(1)-110(n), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the host-managed SSDs 110(1)-110(n) (e.g., a Redundant Array of Independent (or Inexpensive) Disks (RAID system)) whose address, addressable space, location, etc. does not change. Typically the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

Figure 2:
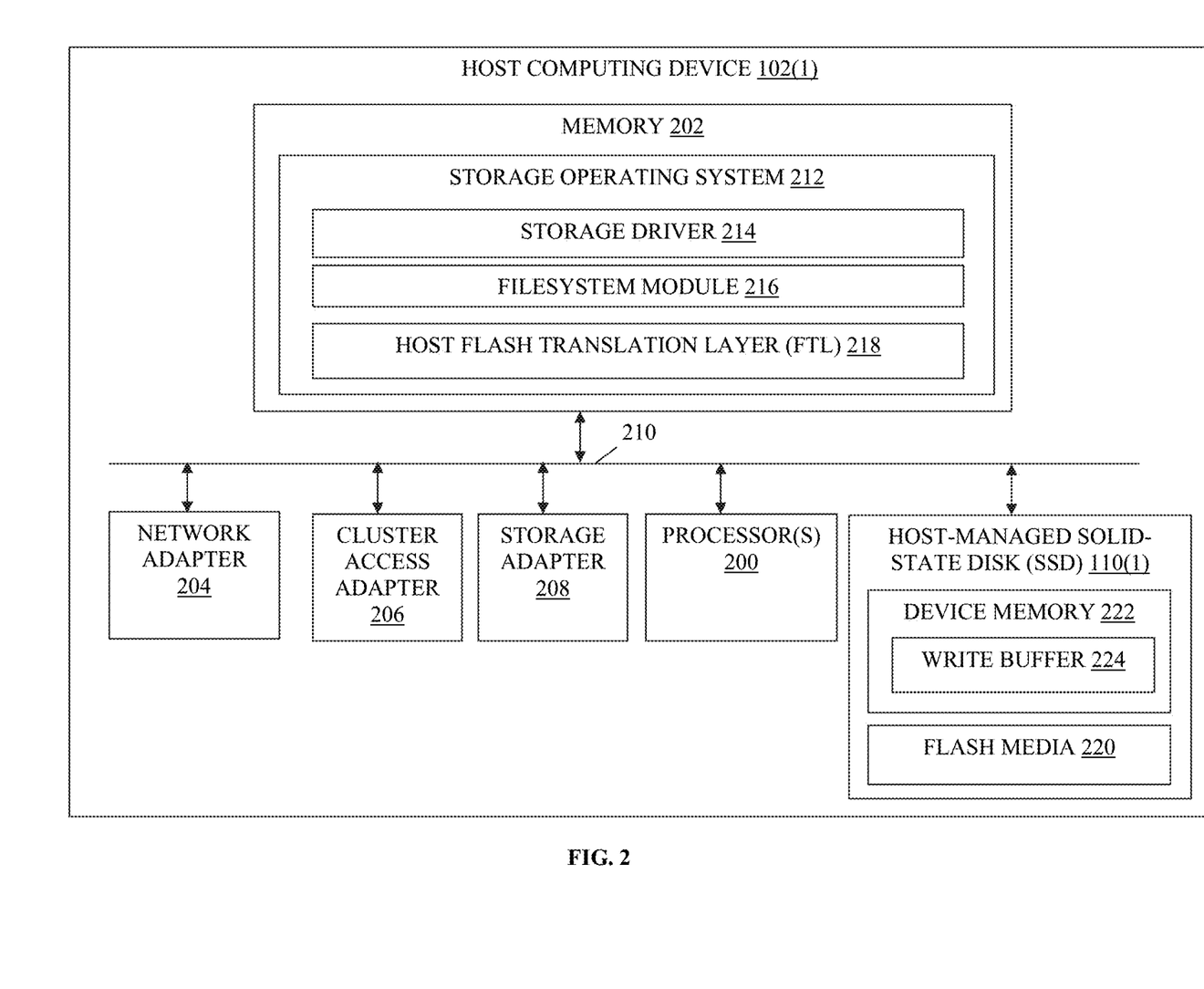
FIG. 2 is a block diagram of an exemplary host device.

Referring to FIG. 2, host computing device 102(1) in this particular example includes processor(s) 200, a memory 202, a network adapter 204, a cluster access adapter 206, a storage adapter 208, and a flash storage device 209 interconnected by a system bus 210. The host computing device 102(1) also includes applications 210 including a storage operating system 212 installed in the memory 202 that can, for example, implement a RAID data loss protection and recovery scheme to optimize reconstruction of data of a failed disk or drive in an array. In some examples, the host computing device 102(n) is substantially the same in structure and/or operation as host computing device 102(1), although the host computing device 102(n) can also include a different structure and/or operation in one or more aspects than the host computing device 102(1).

The network adapter 204 in this example includes the mechanical, electrical and signaling circuitry needed to connect the host computing device 102(1) to one or more of the client devices 108(1)-108(n) over network connections 112(1)-112(n), which may comprise, among other things, a point-to-point connection or a shared medium, such as a local area network. In some examples, the network adapter 204 further communicates (e.g., using TCP/IP) via the cluster fabric 104 and/or another network (e.g. a WAN) with cloud storage device(s) (not shown) to process storage operations associated with data stored thereon.

The storage adapter 208 cooperates with the storage operating system 212 executing on the host computing device 102(1) to access information requested by the client devices 108(1)-108(n) (e.g., to access data on the host-managed SSD 110(1)). In some examples, the host-managed SSD 110(1) stores a cache for data maintained on one or more other data storage devices (not shown) coupled to the host computing device 102(1). The data maintained on the other data storage devices may be stored on any type of attached array of writeable media such as magnetic disk drives, flash memory, and/or any other similar media adapted to store information.

In the data storage devices and/or the host-managed SSD 110(1), information can be stored in data blocks. The storage adapter 208 can include I/O interface circuitry that couples to the data storage devices over an I/O interconnect arrangement, such as a storage area network (SAN) protocol (e.g., Small Computer System Interface (SCSI), Internet SCSI (i SCSI), hyperSCSI, Fiber Channel Protocol (FCP)). Information retrieved by the storage adapter 208 and can be processed by the processor(s) 200 (or the storage adapter 208 itself) prior to being forwarded over the system bus 210 to the network adapter 204 (and/or the cluster access adapter 206 if sending to another node in the cluster) where the information is formatted into a data packet and returned to a requesting one of the client devices 108(1)-108(n) and/or sent to another node attached via the cluster fabric 104. In some examples, a storage driver 214 in the storage operating system 212 interfaces with the storage adapter 208 to facilitate interactions with the data storage devices. In particular, the storage driver 214 is used to communicate device commands and read/write requests to disk devices (not shown), as well as the host-managed SSD 110(1).

The storage operating system 212 can also manage communications for the host computing device 102(1) among other devices that may be in a clustered network, such as attached to a cluster fabric 104. Thus, the host computing device 102(1) can respond to client requests to manage data on the host-managed SSD 110(1), other data storage devices, or cloud storage device(s) (e.g., or additional clustered devices) in accordance with the client requests.

The file system module 216 of the storage operating system 212 can establish and manage one or more filesystems including software code and data structures that implement a persistent hierarchical namespace of files and directories, for example. As an example, when a new data storage device (not shown) is added to a clustered network system, the file system module 216 is informed where, in an existing directory tree, new files associated with the new data storage device are to be stored. This is often referred to as "mounting" a filesystem.

In the example host computing device 102(1), the memory 202 can include storage locations that are addressable by the processor(s) 200 and adapters 204, 206, and 208 for storing related software application code and data structures. The processor(s) 200 and adapters 204, 206, and 208 may, for example, include processing elements and/or logic circuitry configured to execute the software code and manipulate the data structures.

The storage operating system 212 also invokes storage operations in support of a file service implemented by the host computing device 102(1). Other processing and memory mechanisms, including various computer readable media, may be used for storing and/or executing application instructions pertaining to the techniques described and illustrated herein. For example, the storage operating system 212 can also utilize one or more control files (not shown) to aid in the provisioning of virtual machines.

In this particular example, the storage operating system 212 also includes a host flash translation layer (FTL) 218. The host FTL 218 is responsible for translating the storage operations (i.e., read/write requests from the applications 210) directly to accesses to flash media 220 (e.g., not-and (NAND) flash memory) of the host-managed SSD 110(1). Accordingly, the host FTL 218 handles and manages the write idiosyncrasies and restrictive rules of the flash media 220. In particular, the host FTL 218 receives application write requests and stores associated data in a write buffer 224 of the host-managed SSD 110(1).

In one example, the host FTL 218 transfers data associated with a write request from application buffers to the write buffer 224 in a device memory 222 (e.g., DRAM) of the host-managed SSD 110(1) via direct memory access (DMA) over system bus 210 so as to advantageously not use any cycles of processor(s) 200. The host FTL 218 tracks the contents of the write buffer 224 in the device memory 222 and, when write rules of the flash media 220 are satisfied, issues a physical media copy request to transfer at least a portion of the data to the flash media 220. The operation of the host FTL 218 is described and illustrated in more detail later with reference to FIGS. 3-4.

The examples of the technology described and illustrated herein may be embodied as one or more non-transitory computer readable media (e.g., memory 202) having machine or processor-executable instructions stored thereon for one or more aspects of the present technology, which when executed by the processor(s) 200, cause the processor (s) 200 to carry out the steps necessary to implement the methods of this technology, as described and illustrated with the examples herein. In some examples, the executable instructions are configured to perform one or more steps of a method, such as one or more of the exemplary methods described and illustrated later with reference to FIGS. 3-4, for example.

Figure 3:
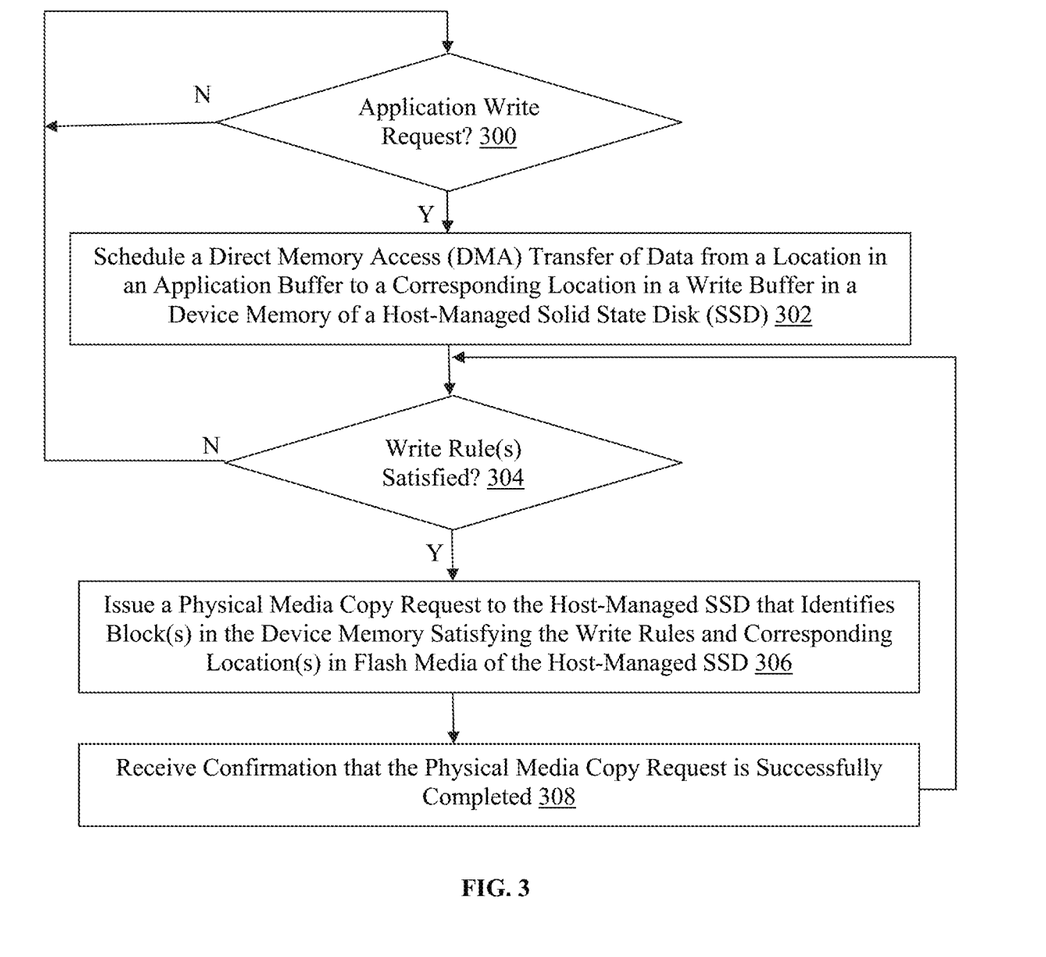
FIG. 3 is a flowchart of an exemplary method for facilitating efficient storage operations using host-managed solid-state disks (SSDs)

Referring more specifically to FIG. 3, a flowchart illustrating an exemplary method for facilitating efficient storage operations using host-managed SSDs is illustrated. In step 300 in this example, the host FTL 218 of the host computing device 102(1) determines whether a write request has been issued by one of the application(s) 210. In this example, the host FTL 218 is configured to intercept write storage operations issued by the application(s) 210. The one of the application(s) 210 may be attempting to cache data on the host-managed SSD 110(1) as part of a data storage service provided by the operating system 212, for example, although other types of applications could issue the write request for other purposes in other examples.

If the host computing device 102(1) determines that a write request has not been intercepted from one of the application(s) 210, then the No branch is taken back to step 300, and the host computing device 102(1) effectively waits for an application write request to be received. However, if the host computing device 102(1) determines in step 300 that a write request has been intercepted from one of the application(s) 210, then the Yes branch is taken to step 302.

In step 302, the host FTL 218 of the host computing device 102(1) schedules a DMA transfer of data from a location in an application buffer in memory 202, for example, to a corresponding location in the write buffer 224. In this example, the host FTL 218 issues a DMA write request identifying the location in the application data buffer and the location in the write buffer 224 to effectuate the DMA transfer. The location in the write buffer 224 may not be contiguous with one or more other data blocks in the write buffer 224, and corresponds to an order associated with the location indicated in the application write request. As described and illustrated in more detail later with reference to FIG. 4, data block 400 is discontiguous with respect to data block 402.

In this example, the host computing device 102(1) maintains a log of the locations indicated in intercepted application write requests to determine whether a location in a current application write request is out-of-sequence. The log is also used to determine the location in the write buffer 224 to identify in the DMA write request. For example, if the location in a current application write request indicates it is out-of-sequence based on a comparison with the log, then the host computing device 102(1) will select a corresponding offset in the write buffer 224 that is discontiguous with respect to an earlier data block in the sequence.

If the location in a current application write request is out-of-sequence, the location in the write buffer 224 identified in the DMA write request will not be contiguous with at least one data block previously transferred into the write buffer 224. The location can be out-of-sequence based on scheduling of the processor(s) 200 or concurrency issues with the application(s) 210 for example. Since DMA is used to transfer the data block, cycles of the processor(s) 200 are advantageously not utilized to transfer the data block from the application buffer to the write buffer 224 hosted in the device memory 22 of the host-managed SSD 110(1).

In step 304, the host FTL 218 of the host computing device 102(1) determines whether each of one or more write rule(s) for writing data blocks to the flash media 220 is satisfied. In this example, the write rule(s) include a requirement that a minimum number of contiguous data blocks are present in the write buffer 224. The minimum number of data blocks corresponds to a minimum write size in examples in which each data block is the same size. In order to determine whether each of the write rule(s) is satisfied, the host FTL 218 can consult the log that is maintained to include an indication of the application data buffer location (s) and/or location(s) to which data has been transferred into the write buffer 224, although other methods for determining whether the write rule(s) are satisfied can also be used.

If the host FTL 218 of the host computing device 102(1) determines that at least one of the write rule(s) is not satisfied, then the No branch is taken back to step 300. Accordingly, the host computing device 102(1) waits for at least one other application write request to be received, the data block(s) associated with which will be necessary to provide a minimum number of contiguous data blocks in order to satisfy the write rule in this example. However, if the host computing device 102(1) determines in step 304 that each of the write rule(s) is satisfied, then the Yes branch is taken to step 306.

In step 306, the host FTL 218 of the host computing device 102(1) issues a physical media copy request to the host-managed SSD 110(1). The physical media copy request identifies data block(s) in the write buffer 224 of the device memory 222 and corresponding locations in the flash media 220 to which the host-managed SSD 110(1) should store the data blocks. The data block(s) that are identified are those that satisfy the write rule(s). The data block(s) can be identified based on an offset or other indication of a location in the write buffer 224, for example. Additionally, firmware of the host-managed SSD 110(1) can process the physical media copy request to effectuate the transfer of the data block(s) from the write buffer 224 to the flash media 220, although the transfer can also be handled in other manners in other examples.

In step 308, the host FTL 218 of the host computing device 102(1) receives confirmation that the physical media copy request successfully completed. In this example, the physical media copy request is communicated via a guaranteed protocol such that it will always successfully complete, although other types of protocols can be used in other examples. Subsequent to issuing the physical media copy request, or receiving the confirmation that the physical media copy request successfully completed, the host FTL 218 can update the log in the memory 202 to reflect that the data block(s) have been stored to the flash media 220 in order to facilitate the appropriate determination regarding the write rule(s) in a subsequent iteration of step 304.

In this example, the host computing device 102(1) proceeds back to step 304 subsequent to receiving the confirmation in step 308. In other examples, one or more of steps 300-308 can be performed in parallel and/or in a different order. In particular, the host computing device 102(1) can receive an application write request in step 300 in parallel with issuing a physical media copy request in step 306, for example.

Figure 4:
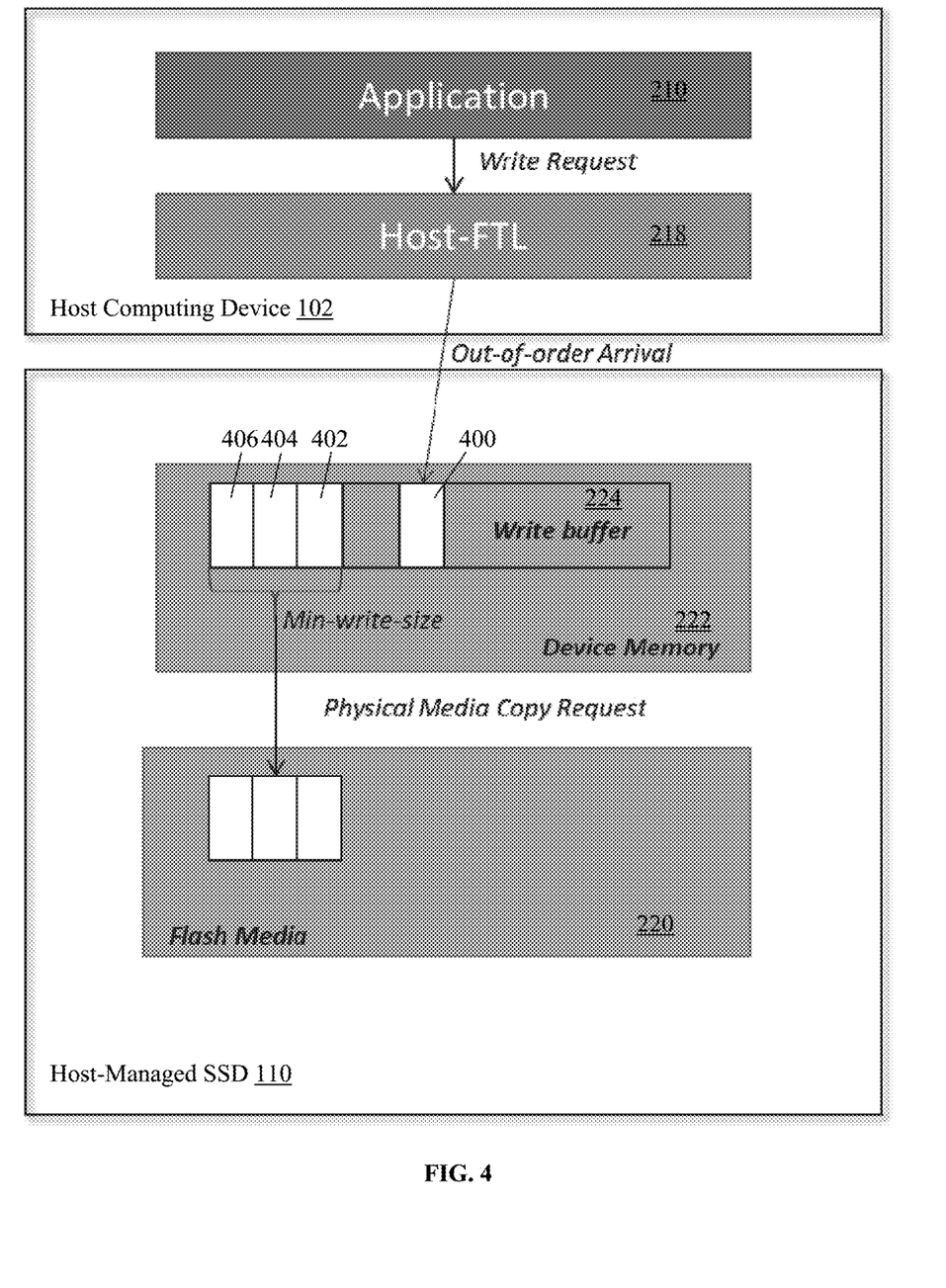
FIG. 4 is functional block diagram of an exemplary method for facilitating efficient storage operations using host-managed SSDs.

Referring more specifically to FIG. 4, a flow diagram of an exemplary method for facilitating efficient storage operations using host-managed SSDs is illustrated. In this example, the application 210 executing on the host computing device 102 issues a write request to store data on the host-managed SSD 110. The write request is intercepted by the host FTL 218 and includes an indication of an application data buffer in main memory 202 of the host computing device 102, for example, storing at least one data block 400.

In this example, the data block 400 is received out-of-order. The host FTL 218 can determine that the data block 400 is out-of-order by consulting a stored log that identifies the location in the application buffer associated with data block 402, which can be compared to that of the application buffer associated with data block 400 identified in the intercepted write request. The host FTL 218 then issues a DMA write request identifying the application buffer and a location in the write buffer 224 in the device memory 222 to which the data block 400 should be transferred. Since the data block 400 is out-of-order, the identified location in the write buffer 224 is not contiguous.

The host FTL 218 in this example subsequently determines that the rule for writing to the flash media 220 requiring a minimum write size, or minimum number of contiguous data blocks, is satisfied. The determination can be based on the contents of the log, for example, although other methods for determining that the rule is satisfied can also be used. Since the write rule is satisfied, the host FTL 218 issues a physical media copy request to copy the data blocks 402, 404, and 406 from the write buffer 224 to the flash media 220. The location(s) in the flash media 220 identified in the physical media copy request for the data blocks 402, 404, and 406 can also be determined based on logged locations identified in the intercepted write requests associated with the data blocks 402, 404, and 406 or any other type of data structure or mapping, for example.

Accordingly, with this technology, a write buffer is advantageously maintained in a device memory of a host-managed SSD. Since the write buffer is maintained on the host-managed SSD, memory utilization on the host computing device is significantly reduced. The device memory is exposed to, and managed by, an FTL of the host computing device. In particular, the host computing device manages the transfer of data in application buffers identified in application write requests to the write buffer via DMA, thereby reducing processor utilization required to carry out storage operations associated with writing data to host-managed SSDs.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method, comprising:
    initiating, by a host processor of a computing device, a direct memory access (DMA) transfer of a data block from a first location indicated in an application write request to a write buffer in a device memory of a solid state disk (SSD);
    determining, by the host processor of the computing device, when one or more write rules are satisfied based on content of the write buffer in the device memory of the SSD, wherein the content comprises at least the data block and one or more other data blocks previously transferred to the write buffer; and
    issuing, by the host processor of the computing device, a physical media copy request to transfer at least a portion of the content from the write buffer in the device memory of the SSD to flash media of the SSD, when the determination indicates the write rules are satisfied.

2. The method of claim 1, further comprising issuing, by the host processor of the computing device, a DMA write request identifying a second location in the write buffer that corresponds to the first location indicated in the application write request to effectuate the DMA transfer.

3. The method of claim 2, wherein the second location in the write buffer is discontiguous with one or more of the other data blocks in the write buffer and corresponds to an order associated with the first location indicated in the application write request.

4. The method of claim 1, wherein one or more of the write rules require a minimum number of contiguous data blocks and the at least a portion of the content comprises the minimum number of contiguous data blocks.

5. The method of claim 1, wherein the device memory comprises a dynamic random access memory (DRAM), the flash media comprises a not-and (NAND) flash memory, the SSD exposes the device memory and the flash media to an application executed by the computing device, and the application originated the application write request.

6. The method of claim 1, wherein the DMA transfer is initiated, the determination is made, and the physical media copy request is issued by a flash translation layer (FTL) of the computing device.

7. A non-transitory machine readable medium having stored thereon instructions for facilitating efficient storage operations using host-managed solid-state disks (SSDs), the instructions comprising machine executable code that, when executed by a host processor of at least one machine, causes the machine to:
    initiate a direct memory access (DMA) transfer of a data block from a first location indicated in an application write request to a write buffer in a device memory of a solid state disk (SSD);
    determine when one or more write rules are satisfied based on content of the write buffer in the device memory of the SSD, wherein the content comprises at least the data block and one or more other data blocks previously transferred to the write buffer; and
    issue a physical media copy request to transfer at least a portion of the content from the write buffer in the device memory of the SSD to flash media of the SSD, when the determination indicates the write rules are satisfied.

8. The non-transitory machine readable medium of claim 7, wherein the machine executable code, when executed by the host processor of the machine, further causes the machine to issue a DMA write request identifying a second location in the write buffer that corresponds to the first location indicated in the application write request to effectuate the DMA transfer.

9. The non-transitory machine readable medium of claim 8, wherein the second location in the write buffer is discontiguous with one or more of the other data blocks in the write buffer and corresponds to an order associated with the first location indicated in the application write request.

10. The non-transitory machine readable medium of claim 7, wherein one or more of the write rules require a minimum number of contiguous data blocks and the at least a portion of the content comprises the minimum number of contiguous data blocks.

11. The non-transitory machine readable medium of claim 7, wherein the device memory comprises a dynamic random access memory (DRAM), the flash media comprises a not-and (NAND) flash memory, and the SSD exposes the device memory and the flash media to a host of an application that originated the application write request.

12. The non-transitory machine readable medium of claim 7, wherein the DMA transfer is initiated, the determination is made, and the physical media copy request is issued by a flash translation layer (FTL) of a computing device coupled to the SSD.

13. A computing device, comprising:
a host memory containing machine readable medium comprising machine executable code having stored thereon instructions for facilitating efficient storage operations using host-managed solid-state disks (SSDs); and
a host processor coupled to the host memory, the host processor configured to execute the machine executable code to cause the host processor to:
initiate a direct memory access (DMA) transfer of a data block from a first location indicated in an application write request to a write buffer in a device memory of a solid state disk (SSD);
determine when one or more write rules are satisfied based on content of the write buffer in the device memory of the SSD, wherein the content comprises at least the data block and one or more other data blocks previously transferred to the write buffer; and
issue a physical media copy request to transfer at least a portion of the content from the write buffer in the device memory of the SSD to flash media of the SSD, when the determination indicates the write rules are satisfied.

14. The computing device of claim 13, wherein the host processor is further configured to execute the machine executable code to further cause the host processor to issue a DMA write request identifying a second location in the write buffer that corresponds to the first location indicated in the application write request to effectuate the DMA transfer.

15. The computing device of claim 14, wherein the second location in the write buffer is discontiguous with one or more of the other data blocks in the write buffer and corresponds to an order associated with the first location indicated in the application write request.

16. The computing device of claim 13, wherein one or more of the write rules require a minimum number of contiguous data blocks and the at least a portion of the content comprises the minimum number of contiguous data blocks.

17. The computing device of claim 13, wherein the device memory comprises a dynamic random access memory (DRAM), the flash media comprises a not-and (NAND) flash memory, the SSD exposes the device memory and the flash media to an application executed by the computing device, and the application originated the application write request.

18. The computing device of claim 13, wherein the DMA transfer is initiated, the determination is made, and the physical media copy request is issued by a flash translation layer (FTL) of the computing device.

19. The computing device of claim 13, wherein the data block is transferred via DMA directly from the location indicated in the application write request to the write buffer in the device memory of the SSD without buffering the data block in the host memory.

20. The computing device of claim 14, wherein the host processor is further configured to execute the machine executable code to further cause the host processor to determine the second location based on a log maintained in the host memory and comprising a plurality of locations indicated in intercepted application write requests.

* * * * *